Patented Oct. 12, 1954

2,691,640

UNITED STATES PATENT OFFICE 2,691,640

ACRYLONITRILE-DIMETHYLAMINO-METHYLSTYRENE COPOLYMERS

Hugh T. Patterson, Waynesboro, Va., and Irving D. Webb, Wilmington, Del., assignors to E. I. du Pont de Nemours & Company, Wilmington, Del., a corporation of Delaware No Drawing. Application March 13, 1951, Serial No. 215,396

3 Claims. (Cl. 260—41)

This invention relates to dye-receptive copolymers of acrylonitrile and to a process for the production thereof. More particularly, it relates to conjoint polymers of acrylonitrile with dimethylaminomethylstyrene, and to a process for preparing the said conjoint polymers.

One of the most important synthetic fibers in commercial production today is composed of polymerized acrylonitrile. However, polyacrylonitrile fibers have been deficient in an important respect, namely in their receptivity to most dyestuffs which can be employed with complete satisfaction in other fibrous materials.

An object of this invention is to improve the dye receptivity of polyacrylonitrile fibers. A more specific object of the invention is to provide an acrylonitrile copolymer having satisfactory dye receptivity. Other objects of the invention will appear hereinafter. The aforesaid objects are accomplished in accordance with this invention by providing novel conjoint polymers of acrylonitrile and a dimethylaminomethylstyrene. More specifically it has been discovered in accordance with this invention that copolymers of exceptionally high tensile strength and extraordinary durability can be obtained by copolymerizing acrylonitrile with p-dimethylaminomethylstyrene, especially when the quantity of dimethylaminomethylstyrene component is not greater than about 10% of the weight of the copolymer. These novel acrylonitrile/p-dimethylaminomethylstyrene copolymers are further characterized by their receptivity to common dyestuffs, particularly acid dyestuffs.

The p-dimethylaminomethylstyrene employed in the practice of this invention can be prepared by reaction between dimethylamine and p-(chloromethyl) styrene. p-Dimethylamino-methylstyrene has the following formula:

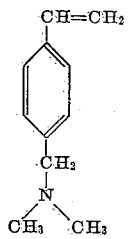

In general the customary mode of practicing the invention is as follows: The acrylonitrile and p-dimethylaminomethylstyrene monomers are dissolved or dispersed in an aqueous medium, heated to around 45° C. A water soluble peroxy catalyst, preferably a salt of perdisulfuric acid in combination with a sulfoxy type reducing agent, is added and the polymerization conducted under a blanket of nitrogen. The copolymer precipitates as it forms and can be separated readily from the polymerization medium by filtration. After washing and drying, the finely divided copolymer is ready for use in preparing articles of commerce.

The following examples in which parts are given by weight more fully illustrate the invention.

Example 1

In a glass container were placed 380 parts of deaerated, deionized water, 35.6 parts of acrylonitrile, 1.88 parts of p-dimethylaminomethylstyrene, 5.78 parts of 2.02 Normal sulfuric acid (an amount equivalent to the aminostyrene monomer), 0.1875 part of ammonium perdisulfate and 0.375 part of sodium metabisulfite. The container was flushed with nitrogen and heated to 45° C. for one hour with stirring. After this time, the copolymer product was filtered, washed with water, and dried. Twenty-one parts of copolymer, representing a 56% yield, were obtained. Titration of the filtrate and wash liquors for amine groups indicated that the copolymer product contained 7.6% by weight of combined dimethylaminomethylstyrene. The copolymer was soluble in dimethylformamide and dilute solutions thereof were used to determine that the copolymer had an intrinsic viscosity of 1.94. A 16% solution of this copolymer in dimethylformamide was used in casting a film by standard technique. The film was boiled in water to remove residual solvent and subsequently dyed in a boiling water bath at a pH of 2.0 containing 2.5% by weight of the film of an acid dyestuff (1-amino-2-sulfo-4-anilino-anthraquinone). The dye bath was completely exhausted in four minutes and the copolymer film was dyed to a deep blue shade.

Example 2

A reaction kettle charged with 1000 parts of deionized water and heated to 44° C. A constant pressure of nitrogen was maintained above the liquid level by allowing the gas to bubble slowly out of a water seal on an attached condenser. The following reactants were then added:

86.4 parts of acrylonitrile monomer
3.6 parts of p-dimethylaminomethylstyrene
0.45 part of ammonium perdisulfate (catalyst)
0.90 part of sodium metabisulfite (activator)
10.0 parts of 2.02 Normal sulfuric acid.

With constant mechanical agitation, the mixture became cloudy in 5 to 10 seconds. After 60 minutes of batch reaction, the various reactants were metered-in to the polymerizer at rates adjusted to keep the concentrations of the reactants constant at the above ratios throughout the reaction. As the additional reactants were added, the slurry of polymer in the kettle was allowed to overflow and was continuously filtered. The addition of reactants and corresponding slurry overflow was adjusted to pass a charge of 1200 parts of material through the kettle every 51 minutes. With the pH of the reaction mixture at 5.5, the conversion to polymer was 60% and the polymer had an intrinsic viscosity, measured in dimethylformamide, of 1.93. When the pH of the reaction mixture was lowered to 5.1 by increasing the rate of acid addition the conversion to polymer was 61% and the polymer had an intrinsic viscosity of 1.45. Titration of the basic amine groups in the polymer dissolved in tetramethylene cyclic sulfone revealed that the polymer was composed of 94% by weight of acrylonitrile units and 6% by weight of p-dimethylaminomethylstyrene units.

The invention is not limited to the preparation of binary copolymers. New and useful three or more component copolymer compositions are readily prepared by standard copolymerization techniques. The following examples are illustrative.

*Example 3*

The following materials are charged to a vessel capable of withstanding pressure:

| | Parts |
|---|---|
| Distilled water | 180.0 |
| Vinyl chloride | 54.0 |
| Acrylonitrile | 5.4 |
| p-Dimethylaminomethylstyrene | 0.6 |
| Potassium perdisulfate | 0.6 |
| Sodium lauryl sulfate | 0.6 |

The vinyl chloride is conveniently added last by condensing it in the container cooled to −30° C. Prior to this operation, the acidity of the reaction mixture is adjusted at a pH of about 9 by the addition of aqueous sodium hydroxide. After closing the vessel, the polymerization is conducted at 40° C. for 18 hours. After this time, the residual pressure is released and the copolymer dispersion filtered. The washed and dried copolymer product dissolves in acetone and titration of the basic amine groups indicates that it contains 7.5% by weight of p-dimethylaminomethylstyrene units. A film of this copolymer prepared by evaporation of solvent from a 15% solution in acetone can be oriented by drawing and is readily dyeable with acid dyestuffs.

*Example 4*

A copolymer, having the composition 91% by weight acrylonitrile, 3% vinyl acetate, and 6% p-dimethylaminomethylstyrene, is prepared in the folllowing manner:

A solution of 3 parts of sodium lauryl sulfate in 300 parts of distilled water is heated to about 75° C. with mechanical stirring in a reaction kettle equipped with a combination reflux and take off condenser. Thirty parts of a mixture of 92% acrylonitrile, 4% vinyl acetate and 4% p-dimethylaminomethylstyrene are added continuously to the aqueous solution over a four-hour period. Simultaneously, the catalyst, 0.15 parts of potassium perdisulfate dissolved in 15 parts of distilled water, is added. An amount of sulfuric acid equivalent to the p-dimethylaminomethylstyrene, 15 parts of 0.5 Normal solution, is also added continuously. The polymerization medium is maintained at 75° C. during this addition period, after which it is heated to reflux for an hour. After removing residual monomers by steam distillation, the copolymer product is filtered and dried. Its composition is conveniently determined by analysis of the steam distillate for recovered monomers. The amount of basic modifier in the copolymer, i. e., dimethylaminomethylstyrene, can be determined readily by titration of a solution of the copolymer in a solvent such as tetramethylene cyclic sulfone. Commercially useful articles, such as films and fibers, of this copolymer are readily dyed by standard techniques with dispersed acetate, vat, acid and direct dyestuffs.

While the invention is hereinabove illustrated with reference to p-dimethylaminomethylstyrene as the comonomer employed with acrylonitrile, it is to be understood that at least a part thereof may be replaced by o-dimethylaminomethylstyrene and/or m-dimethylaminomethylstyrene.

The proportions of dimethylaminomethylstyrene in the unpolymerized mixture may vary from 1% to 99%, but for the most satisfactory fiber-forming materials the quantity of dimethylaminomethylstyrene is preferably about 2% to 10% of the total weight of polymerizable components. The copolymerization takes place with considerable ease when p-dimethylaminomethylstyrene is used, and the proportion of p-dimethylaminomethylstyrene in the copolymer can be controlled by varying the proportion of p-dimethylaminomethylstyrene in the unpolymerized mixture.

The copolymers of this invention may contain more than two components if desired. Components which may be present in addition to acrylonitrile and p-dimethylaminomethylstyrene include vinyl chloride, vinyl acetate, methacrylontrile, methacrylic and/or acrylic acids and their esters or amides, etc. It is to be understood that a part (preferably a minor part) of the acrylonitrile may be substituted by one or more of these comonomers.

The catalysts which are effective in bringing about the copolymerization of acrylonitrile and p-dimethylaminomethylstyrene are in general those which are effective for converting ethylene to solid ethylene polymers. These catalysts include oxygen, inorganic and organic peroxides including persulfates, hydrogen peroxide, diacyl peroxides, primary, secondary and tertiary alkyl peroxides and hydroperoxides and esters thereof, percarboxylates including peracids and salts thereof, alkyl and cycloalkyl peroxides, hydroxyhydroperoxides, olefin peroxides, and other types of peroxy polymerization catalysts. Other organic polymerization catalysts which are effective include azo compounds, hydrazinium compounds, compounds containing chlorine attached directly to a negative nitrogen atom and the like. Combinations of these catalysts with reducing agents which have the effect of increasing the rate of polymerization at low temperature may also be employed. In fact, the preferred catalyst combination is a water soluble persulfate and a sulfoxy type reducing agent.

The polymerization is preferably carried out in the presence of a liquid medium in which the copolymer is relatively insoluble. Suitable media include water, alcohols, hydrocarbons, ethers, etc. If an emulsion system is employed, it is desirable to employ a dispersing agent to obtain adequate contact between the monomeric components of the copolymer and the catalyst. Suitable dispersing agents include fatty acid soaps such as salts of stearic, oleic and lauric acids, long-chain alkyl sulfates and sulfonates such as dodecyl-1 acid sulfate, tetradecyl-1 acid sulfate, octadecyl-1 acid sulfate, dodecane-1-sulfonic acid, tetradecane-1-sulfonic acid, hexadecane-1-sulfonic acid, and octadecane-1-sulfonic acid. The salts of long-chain sulfonated paraffin oil hydrocarbons are also effective dispersants and need be employed only in small proportions to achieve the desired results.

The quality of the polymerized product is enhanced by agitation of the polymerization mixture. Any method of agitation may be used in producing and maintaining the polymerization emulsions. The most commonly employed method of mixing is by stirring, preferably in vessels containing suitable baffles. Other methods include shaking, tumbling, and the use of turbo-mixers.

The dispersing agents of this invention are in general useful in forming stable emulsions which after they are once formed require little or no agitation thereafter. It has been found however that polymerization occurs more readily in certain emulsions while they are being agitated. It is accordingly preferred to assist the dispersing agent in producing and maintaining the emulsion by mechanical means.

The copolymerization of acrylonitrile with p-dimethylaminomethylstyrene in accordance with this invention takes place over a rather wide range of temperature. In general the polymerization proceeds at a fairly rapid rate at ordinary room temperature, but the invention may also be operated at temperatures as low as about $-20°$ C., or as high as about $100°$ C. or even higher, in closed systems under pressure. The preferred polymerization temperature, however, is in the range of about $20°$ to $60°$ C.

Since the presence of oxygen affects the rate of polymerization, it is generally desirable for purposes of control to displace air from the polymerization vessel by means of an inert gas. Suitable gases are nitrogen, carbon dioxide, methane and helium.

The process of this invention is not limited to any particular apparatus, and the polymerization may be conducted either batchwise or continuously. In the continuous process one or more of the monomeric components may be introduced at a plurality of points along the polymerization vessel. In the continuous system the rate at which the polymerization mixture is passed through the vessel may be such as to produce either straight line or turbulent flow. Suitable reaction vessels may be constructed of or lined with stainless steel, nickel, silver, lead, etc. Vessels equipped with glass or enamel liners may also be used.

The acrylonitrile/p-dimethylaminomethylstyrene copolymers can be isolated from the dispersed polymerization product by a variety of methods. In many cases, particularly when the acrylonitrile component predominates, the polymer is granular and is readily filterable. Otherwise, the dispersion may be sprayed into a heated and/or evacuated chamber whereby the water is removed as vapor and the polymer falls to the bottom of the chamber. The polymer may also be isolated by adding an electrolyte to the dispersion whereby the dispersed particles tend to cohere and precipitate. Still another method for coagulating the copolymer is to employ an electric current to attract the particles of copolymer to a membrane or to an electrode whereby coagulation and adhesion of the polymer particles takes place. The coagulated polymer can be dried by any of the methods known in the art, such as by use of ovens at moderate temperatures or in open trays under a gentle stream of warm dust-free air.

While the products of this invention are primarily useful in the manufacture of textile fibers which can be dyed with considerable ease, these copolymers also may be employed in numerous other ways, such as in the preparation of molded articles, coating, films, foils, adhesives, and the like. The dimethylamino group in the copolymer constitutes a reactive center which can be acted upon by reagents capable of undergoing addition or substitution reactions with such amino groups. In this manner cross-linked products, etc. can be obtained. In such applications as the foregoing the copolymer may be combined with, or prepared in the presence of, plasticizers, stabilizers, fillers, pigments, dyes, and other synthetic resins which are compatible with the said copolymer.

Since many apparently widely different embodiments of this invention can be made without departing from the spirit and scope thereof, it is to be understood that the invention is not limited except as defined in the following claims.

We claim:

1. A copolymer in which the monomeric components consist of from 2% to 10% by weight of p-dimethylaminomethylstyrene, the remainder of the copolymer being composed of copolymerized acrylonitrile.

2. A process which comprises copolymerizing in aqueous medium a mixture of approximately from 2% to 10% by weight of p-dimethylaminomethylstyrene and correspondingly from 98% to 90% by weight of acrylonitrile in the presence of a peroxy compound as catalyst.

3. An article of commerce comprising a fibrous polymer comprising from 2% to 10% by weight of p-dimethylaminomethylstyrene and correspondingly from 98% to 90% by weight of acrylonitrile, and an organic dyestuff.

References Cited in the file of this patent

UNITED STATES PATENTS

| Number | Name | Date |
| --- | --- | --- |
| 1,973,000 | Konrad | Sept. 11, 1934 |
| 2,595,907 | Thomas | May 6, 1952 |
| 2,601,251 | Bruson | June 24, 1952 |

OTHER REFERENCES

Marvel et al., J. Polymer Sc. 1, 275–288, especially pages 287–288 (1936).